O. G. LYON.
SEAMING MACHINE.
APPLICATION FILED JULY 28, 1914.
1,136,544.
Patented Apr. 20, 1915.
2 SHEETS—SHEET 1.
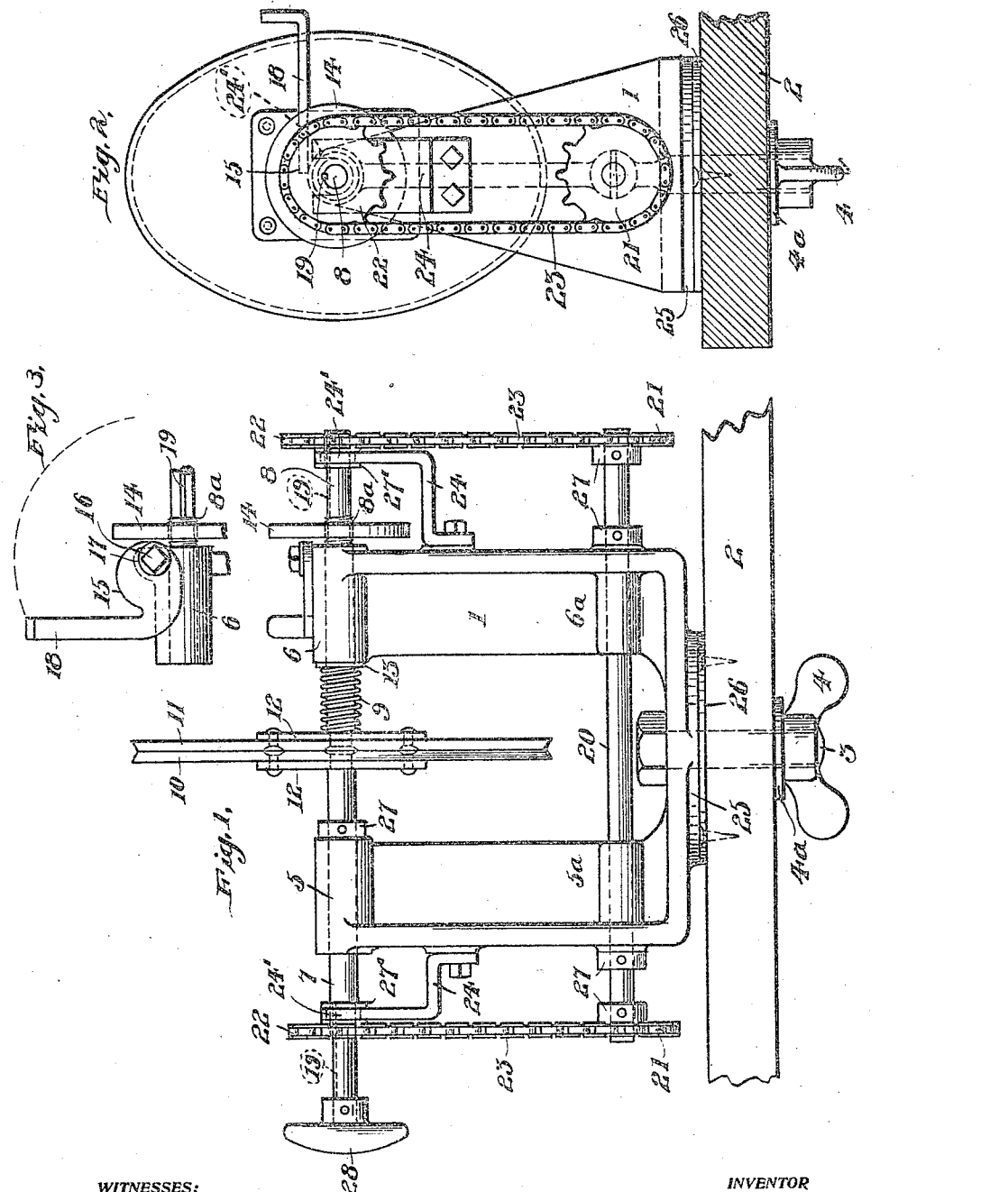
WITNESSES:
Clair L. Van Ness.
Herman K. Sisler.
INVENTOR
O. G. Lyon
BY
A. M. Wilson
ATTORNEY O. G. LYON.
SEAMING MACHINE.
APPLICATION FILED JULY 28, 1914.
1,136,544.
Patented Apr. 20, 1915.
2 SHEETS—SHEET 2.
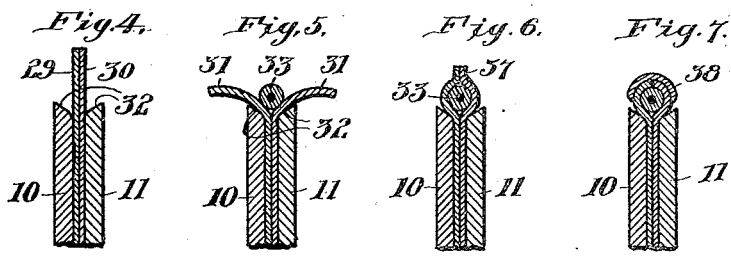
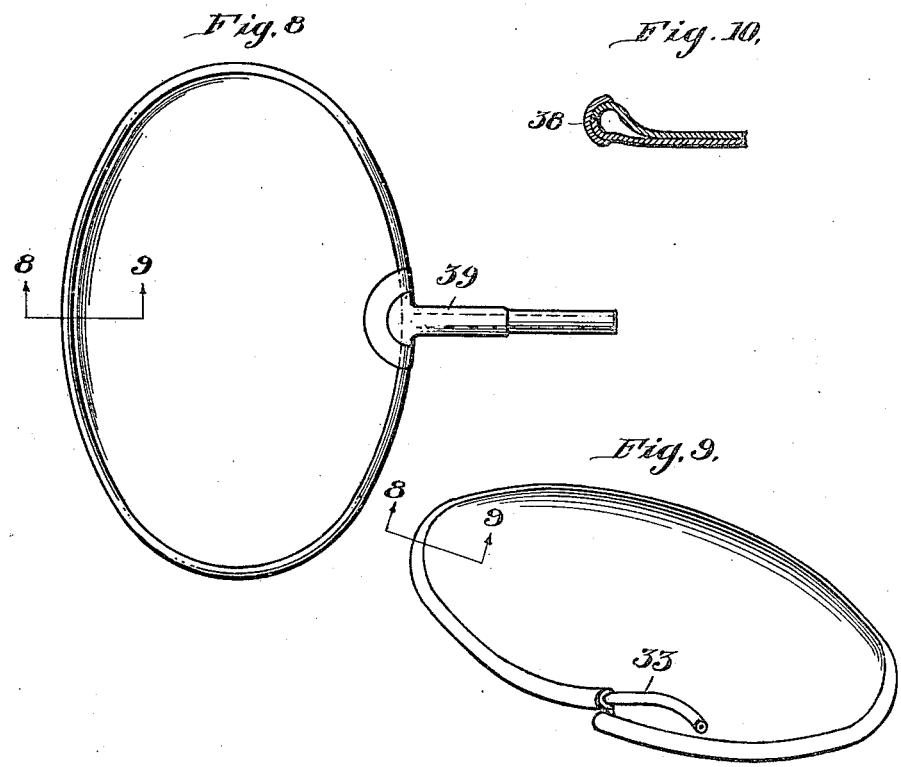
WITNESSES:
Clair L. Van Ness.
Herman K Sisler
INVENTOR
O. G. Lyon
BY
A. M. Wilson
ATTORNEY

UNITED STATES PATENT OFFICE.

OSSIAN G. LYON, OF AKRON, OHIO.

SEAMING-MACHINE.

1,136,544.   Specification of Letters Patent.   Patented Apr. 20, 1915.

Application filed July 28, 1914. Serial No. 853,624.

*To all whom it may concern:*

Be it known that I, OSSIAN G. LYON, a citizen of the United States, residing at Akron, in the county of Summit and State of Ohio, have invented certain new and useful Improvements in Seaming-Machines, of which the following is a specification.

This invention relates to seaming machines adapted for use in the manufacture of rubber bags or like articles made up of two sheets of rubber or other sheet material.

The primary object of the invention is to provide effective means for holding together the sheets composing the bag in such a manner as to permit their edges to be readily joined to a welt and folded down thereon to receive a binder strip.

A further object of the invention is to provide means for revolving the sheet holding means, and for moving the same to clamp and release the sheets.

The invention also comprehends various novel features whereby the machine will be rendered readily operable and of simple, compact, and effective construction.

In the accompanying drawings which constitute a part of this specification, Figure 1 is a side elevation of a machine embodying the invention, the clamping plates being in the contacting position which they occupy to grip the rubber sheets between them. Fig. 2 is an end elevation partly in vertical section. Fig. 3 is a detail plan partly broken away showing the operating cam for separating the parts. Figs. 4, 5, 6, and 7 are detail radial sections of the clamping plates illustrating the manner of connecting the rubber sheets and applying the welt and binding strip thereto. Fig. 8 is a perspective view of the bag with its attached neck. Fig. 9 is a similar view of the bag when removed from the machine with its edge split and the welt partly removed, and Fig. 10 is a section of the finished seam.

The reference numeral 1 designates a U-shaped frame adapted to be pivotally supported on a table 2 or like support by means of a bolt 3 extending through an opening in the table and to be secured by a wing-nut 4 and washer 4ª. The upper ends of the sides of the frame 1 are formed with alined bearings 5 and 6 and adjacent their lower ends with horizontally alined bearings 5ª and 6ª.

Within the upper bearings 5 and 6 are rotatably mounted spindles 7 and 8, the latter having arranged thereon a coil spring 9. Mounted upon the inner end of each of the spindles is a clamping plate designated respectively as 10 and 11, to the outer side of each of which is suitably secured a central reinforcing gusset plate 12. A washer 13 at the inner end of the bearing 6 provides a bearing-surface for the outer end of the spring 9, the opposite end of which bears upon the adjacent plate 12.

The spindle 8 is screw-threaded for a portion of its length and upon this threaded portion 8ª is adjustably-mounted a disk 14 coöperating with a cam 15 eccentrically pivoted by a bolt 16 to a lug 17 projecting from the bearing 6, and adapted to be operated by a lever 18 projecting from the cam as best shown in Fig. 3. As the spindles 7 and 8 are splined as shown at 19 it will be apparent that they are capable of moving longitudinally within their bearings.

Normally the clamping plates are held together in clamping contact by the spring 9, but when the disk 14 is forced rearward by the contact therewith of the cam 15, the plates are separated for the insertion or removal of the two sheets of rubber as will be further referred to hereinafter. Within the lower bearings 5ª and 6ª of the frame 1 is mounted a shaft 20 upon the ends of which are mounted sprocket wheels 21 vertically alined with similar wheels 22 mounted on the spindles 7 and 8 and connected with the lower sprocket wheels 21 by sprocket chains 23.

The spindles 7 and 8 extend through bearings provided in the upper ends of two oppositely-disposed angle-brackets 24, secured at the lower ends to the opposite sides of the frame 1. The frame 1 and parts supported thereon are rotatably adjustable upon the bolt 3, circular plates 25 and 26 secured respectively to the frame and the table 2, the upper plate 25 being adapted to revolve upon the lower plate 26. Suitable collars 27 are employed upon the shaft 20 to space and secure the frame 1 and sprocket wheels 21.

The upper ends of brackets 24 are forked as at 24′ to receive the grooved collars 27′ carried by the inner faces of sprockets 22 and splined on the spindles 7 and 8. Mounted upon the outward end of the spindle 7, is a knob 28 which serves as a handle for turning the spindles, and the shaft 20 (through the sprocket connections) and also as a push-plate to be operated by the pressure of the breast of the operator to hold the plates 10 and 11 in firm clamping contact with the sheets.

Referring now to Figs. 4 to 7, inclusive, Fig. 4 shows the sheets 29 and 30 between the clamping plates 10 and 11 and Fig. 5 shows the edges 31 of the two sheets bent outward over the beveled edges 32 of the plates to receive the welt 33. After the welt is in position between the edges of the sheets, said edges are bent upward and cemented together as shown in Fig. 6, after which the fin 37 is trimmed off, and a binding strip 38 is cemented upon the abutting edges of the sheets.

The machine constructed as above described insures the turning of the sheet clamping plates in unison, which is essential, the plates being of irregular shape, the shape varying according to the form of bag to be made, oval, square, round, or other desired contours.

I would have it understood that the invention comprehends and includes all such modifications and variations in the structural and mechanical details of construction as may fall within the terms and scope of the claims.

What I claim and desire to secure by Letters Patent is:—

1. A bag-making apparatus, comprising longitudinally alined spindles, means for revolving said spindles in unison, confronting clamping plates between which the edges of a plurality of sheets are adapted to be secured, resilient means bearing upon one of said plates, and means for separating said plates for the insertion and removal of said sheets.

2. A bag-making apparatus, comprising longitudinally alined spindles, means for revolving said spindles in unison, confronting clamping plates between which the edges of a plurality of sheets are adapted to be secured, resilient means bearing upon one of said plates, and means for separating said plates for the insertion and removal of said sheets embodying a member adjustable on one of said spindles, and cam mechanism for moving said member.

3. The combination with a support, of a frame pivotally connected thereto and provided with shaft bearings, and with spindle bearings, a shaft mounted in said shaft bearings, longitudinally alined spindles within said spindle bearings, a pair of confronting clamping plates on said spindle, and means for separating and closing together said plates, comprising cam mechanism, a movable member on one of said spindles, and a resilient member interposed between one of said plates and the adjacent spindle bearing.

4. In apparatus for seaming rubber bags and like articles, a pair of confronting clamping plates having beveled edges arranged to form a groove when the plates are together, said plates being adapted to hold between them a plurality of sheets and the groove being adapted to receive a welt, in combination with means for connecting and disconnecting said plates.

5. In apparatus for seaming rubber bags or like articles, a pair of confronting clamping plates having beveled edges arranged to form a groove when the plates are together, said plates being adapted to hold between them a plurality of sheets and the groove being adapted to receive a welt between the edges of said sheets, in combination with cam mechanism for separating said plates, and resilient means normally holding said plates together.

In testimony whereof I affix my signature in presence of two witnesses.

OSSIAN G. LYON.

Witnesses:
Wm. A. Martin,
A. W. Bennage.

Copies of this patent may be obtained for five cents each, by addressing the "Commissioner of Patents, Washington, D. C."